United States Patent
Nie et al.

(10) Patent No.: US 9,990,429 B2
(45) Date of Patent: Jun. 5, 2018

(54) AUTOMATED SOCIAL NETWORKING GRAPH MINING AND VISUALIZATION

(75) Inventors: Zaiqing Nie, Beijing (CN); Yong Cao, Beijing (CN); Gang Luo, Beijing (CN); Ruochi Zhang, Beijing (CN); Xiaojiang Liu, Beijing (CN); Yunxiao Ma, Beijing (CN); Bo Zhang, Beijing (CN); Ying-Qing Xu, Beijing (CN); Ji-Rong Wen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 291 days.

(21) Appl. No.: 12/780,522

(22) Filed: May 14, 2010

(65) Prior Publication Data

US 2011/0283205 A1 Nov. 17, 2011

(51) Int. Cl.
*G06F 3/0481* (2013.01)
*G06F 3/0482* (2013.01)
(Continued)

(52) U.S. Cl.
CPC .............. *G06F 17/30867* (2013.01)

(58) Field of Classification Search
CPC .......... G06F 3/048; G06F 3/00; G06F 3/0481; G06F 3/0482; G06F 3/0483; G06F 9/4443; G06F 3/04817; H04N 5/44543
(Continued)

(56) References Cited

U.S. PATENT DOCUMENTS 5,321,833 A * 6/1994 Chang ............... G06F 17/30672

5,544,352 A * 8/1996 Egger ............... G06F 17/30321
707/999.005
(Continued)

FOREIGN PATENT DOCUMENTS

CN 101388024 A 3/2009
CN 101582075 A 11/2009
(Continued)

OTHER PUBLICATIONS

Kapler, et al., "Configurable Spaces: Temporal Analysis in Diagrammatic Contexts", Retrieved at << http://www.oculusinfo.com/papers/Oculus_ConfigSpaces2008_Revised_Jun08.pdf >>, IEEE Visual Analytics Science and Technology 2008, Oct. 19-24, 2008, pp. 43-50.

(Continued)

*Primary Examiner* — Kevin L Young
*Assistant Examiner* — Erik V Stitt
(74) *Attorney, Agent, or Firm* — Katrina A. Lyon; Lyon & Harr, LLP

(57) ABSTRACT

The automated social networking graph mining and visualization technique described herein mines social connections and allows creation of a social networking graph from general (not necessarily social-application specific) Web pages. The technique uses the distances between a person's/entity's name and related people's/entities names on one or more Web pages to determine connections between people/entities and the strengths of the connections. In one embodiment, the technique lays out these connections, and then clusters them, in a 2-D layout of a social networking graph that represents the Web connection strengths among the related people's or entities' names, by using a force-directed model.

20 Claims, 6 Drawing Sheets

(51) Int. Cl.
  *G06F 3/0483* (2013.01)
  *G06F 8/38* (2018.01)
  *G06F 17/30* (2006.01)

(58) Field of Classification Search
  USPC .......................................... 715/810, 764, 763
  See application file for complete search history.

(56) References Cited

U.S. PATENT DOCUMENTS

| | | | |
|---|---|---|---|
| 6,070,134 A * | 5/2000 | Richardson | G06F 17/30734 704/9 |
| 6,377,263 B1 * | 4/2002 | Falacara et al. | 345/473 |
| 7,069,308 B2 * | 6/2006 | Abrams | G06Q 10/10 705/319 |
| 7,539,697 B1 | 5/2009 | Akella et al. | |
| 7,693,702 B1 * | 4/2010 | Kerner et al. | 703/22 |
| 7,747,648 B1 * | 6/2010 | Kraft et al. | 707/790 |
| 7,895,284 B2 * | 2/2011 | Kim | 709/207 |
| 8,510,389 B1 * | 8/2013 | Gurajada | G06Q 10/107 709/205 |
| 8,645,398 B2 * | 2/2014 | Xia | G06F 17/30858 707/751 |
| 2005/0159970 A1 * | 7/2005 | Buyukkokten et al. | 705/1 |
| 2005/0171955 A1 | 8/2005 | Hull et al. | |
| 2005/0267766 A1 * | 12/2005 | Galbreath et al. | 705/1 |
| 2005/0283753 A1 | 12/2005 | Ho et al. | |
| 2007/0106780 A1 * | 5/2007 | Farnham et al. | 709/223 |
| 2007/0124291 A1 | 5/2007 | Hassan et al. | |
| 2007/0143278 A1 * | 6/2007 | Srivastava | G06Q 30/02 |
| 2007/0191100 A1 * | 8/2007 | Counts | 463/42 |
| 2007/0271232 A1 * | 11/2007 | Mattox et al. | 707/3 |
| 2008/0028308 A1 | 1/2008 | Brownlee et al. | |
| 2008/0104225 A1 | 5/2008 | Zhang et al. | |
| 2008/0148179 A1 * | 6/2008 | Sloo | 715/792 |
| 2008/0235582 A1 * | 9/2008 | Zalewski et al. | 715/716 |
| 2008/0250450 A1 * | 10/2008 | Larner | G06Q 30/0256 725/34 |
| 2009/0150378 A1 * | 6/2009 | Skubacz et al. | 707/5 |
| 2009/0157618 A1 * | 6/2009 | Matheny | 707/3 |
| 2009/0248738 A1 | 10/2009 | Martinez et al. | |
| 2009/0271160 A1 * | 10/2009 | Copenhagen et al. | 703/6 |
| 2009/0313102 A1 * | 12/2009 | Le Roy et al. | 705/14.25 |
| 2010/0004975 A1 * | 1/2010 | White et al. | 705/10 |
| 2010/0030715 A1 | 2/2010 | Eustice et al. | |
| 2010/0131489 A1 * | 5/2010 | Goldman-Shenhar | G06F 17/30867 707/710 |
| 2010/0205541 A1 * | 8/2010 | Rapaport | G06Q 10/10 715/753 |
| 2010/0225510 A1 * | 9/2010 | Yasui | 341/118 |
| 2011/0078188 A1 * | 3/2011 | Li | G06Q 30/02 707/776 |
| 2011/0093709 A1 * | 4/2011 | Lunt et al. | 713/168 |
| 2011/0106850 A1 * | 5/2011 | Li et al. | 707/780 |
| 2011/0231382 A1 * | 9/2011 | Xu | G06F 17/278 707/706 |
| 2011/0283205 A1 * | 11/2011 | Nie | G06F 17/30867 715/763 |

FOREIGN PATENT DOCUMENTS

| | | |
|---|---|---|
| EP | 1338966 A2 | 8/2003 |
| JP | 2007-193685 A | 8/2007 |
| JP | 2008-197787 A | 8/2008 |
| WO | 2010/047286 A1 | 4/2010 |

OTHER PUBLICATIONS

"EntityCube", Retrieved at << http://entitycube.research.microsoft.com/readme.htm >>, Retrieved Date—Dec. 12, 2009, pp. 1-2.

"The Next Generation of Data Visualization", Retrieved at << http://www.fmsasg.com/Products/SentinelVisualizer/ >>, Retrieved Date—Dec. 12, 2009, pp. 1-2.

Fan, et al., "Blog-Based Online Social Relationship Extraction", Retrieved at << http://ieeexplore.ieee.org/stamp/stamp.jsp?arnumber=05250697 >>, 8th IEEE International Conference on Cognitive Informatics, Jun. 15-17, 2009, pp. 457-463.

Chakrabarti, et al., "Learning Parameters in Entity Relationship Graphs from Ranking Preferences", Retrieved at << http://www.cse.iitb.ac.in/~soumen/doc/netrank/netrank2b.pdf >>, In ECML/PKDD, vol. 4213 of LNCS, 2006, pp. 91-102.

"First Office Action and Search Report Received for Chinese Application No. 201180023860.1", Dated: Nov. 4, 2014, 14 Pages.

"Office Action issued in Japanese Patent Application No. 2013-511216", Dated: Feb. 10, 2015, 3 Pages (w/o English Translation).

Harda, et al., "Finding Key People and Visualizing their Relationships on the Web", In Information Processing Society of Japan SIG Technical Reports, vol. 2003, Issue 51, May 23, 2003, 10 Pages.

Itsubo, et al., "Knowledge Acquisition and Visualization from Historical Documents", Dec. 11, 2009, pp. 231-238.

"Office Action Issued in Japanese Patent Application No. 2013-511216", Dated: Oct. 13, 2015, 5 Pages.

"Office Action Issued in Chinese Patent Application No. 201180023860.1", Dated: Dec. 25, 2015, 10 Pages.

"Second Office Action Issued in Chinese Patent Application No. 201180023860.1", Dated: Jun. 30, 2015, 10 Pages.

Notice of Third Office Action Issued in China Application No. 201180023860, Dated: Jun. 27, 2016, 7 Pages.

"Office Action Issued in European Patent Application No. 11781108.3", Dated: Feb. 22, 2017, 6 Pages.

"Supplementary Search Report Issued in European Patent Application No. 11781108.3", Dated: Feb. 13, 2017, 4 Pages.

"Office Action Issued in Canadian Patent Application No. 2,797,401", Dated: Jan. 24, 2017, 3 Pages.

Zhou, et al., "A Concentric—Circle Model for Community Mining in Graph Structures", In Technical Report, MSR-TR-2002-123, Nov. 15, 2002, 9 Pages.

"Fourth Office Action Issued in Chinese Patent Application No. 201180023860.1", Dated: Nov. 2, 2016, 8 Pages.

* cited by examiner

AUTOMATED SOCIAL NETWORKING GRAPH MINING AND VISUALIZATION

Many social networking applications have come on-line on the Internet in recent years to allow people to connect both socially and professionally. Typically such social networking applications require a user to create a user identification (ID) and password and to identify their friends in order to create a profile. However, many Web pages, such as news sites, blogs, reviews and so forth, on the World Wide Web or Internet, describe the social activities of people and other entities, even though this information is not listed on social networking application sites.

Additionally, although many social networking applications exist, there are not very many ways that the social connections or relationships between people and other entities that can readily be determined and viewed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The automated social networking graph mining and visualization technique described herein mines social connections and allows visualization of social networking relationships from general (not necessarily social-application specific) Web pages.

More specifically, in one embodiment, the automated social networking graph mining and visualization technique automatically mines and lays out the social networking graph of entities. An entity can be, for example, a person, an organization or even a key word. The technique uses the distances between an entity's name and related entities names on one or more Web pages to determine connections between entities and the strength of these connections.

In the mining process, the inputs are general Web pages. People's or other entities' names and the social connections among them are automatically extracted and integrated. For each entity's name, its social networking graph is defined as a combination of the set of names which are connected to the entity's name in one or more Web pages, and the set of the social connections among those connected entities' names identified from the Web. These social connections can be weighted by a relationship ranking procedure.

In one embodiment, the social networking graph mining and visualization technique can use a layout procedure to generate a two-dimensional (2-D) social networking graph around a person's or other entity's name. In one embodiment of the technique, the layout is automatically generated by using a force-directed model and an energy reduction process. In this layout, the social connection weight is represented by the distance between its two ends. The shorter the distance is, the larger the connection weight is. Also, in one embodiment, the layout procedure clusters the people's or other entities' names that are closely connected to each other together.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the automated social networking graph mining and visualization technique, reference is made to the accompanying drawings, which form a part thereof, and which show by way of illustration examples by which the automated social networking graph mining and visualization technique described herein may be practiced. It is to be understood that other embodiments may be utilized and structural changes may be made without departing from the scope of the claimed subject matter.

1.0 Automated Social Networking Graph Mining and Visualization Technique.

The following sections provide an overview of the automated social networking graph mining and visualization technique, as well as an exemplary architecture, processes and a user interface for employing the technique.

1.1 Overview of the Technique

Social networking has received much attention recently. Social networking applications and services like Facebook and Twitter allow users to grow their own private social network. However, the Internet actually contains public social networks underlying the text in general Web pages. For example, Web pages that describe social activities provide implicit social connections among the people or entities mentioned on these pages. These public implicit social connections can be viewed as a huge social networking graph. Little work has been done to automatically identify and present the social connections among people and other entities from Web pages that were not designed specifically for social networking applications In one embodiment, the automated social networking graph mining and visualization technique automatically identifies social networking connections from general Web pages and provides a social networking graph in a 2-D layout that allows a viewer to easily identify the connections between people or entities in the graph, as well as the strengths of these connections.

In one embodiment, the technique creates a 2-D visualization layout that provides a specific entity's social networking graph as a set of vertices (names) and edges (social connections) arranged in a radial layout based on the connections and strengths of connections between the entity and other entities. The social graph's owner (e.g., the entity for which the graph is generated) is placed in the center. With the mining process and the layout process described above, the social networking graph from the Web is automatically generated and visualized.

1.2 Exemplary Architecture.

Figure 1:
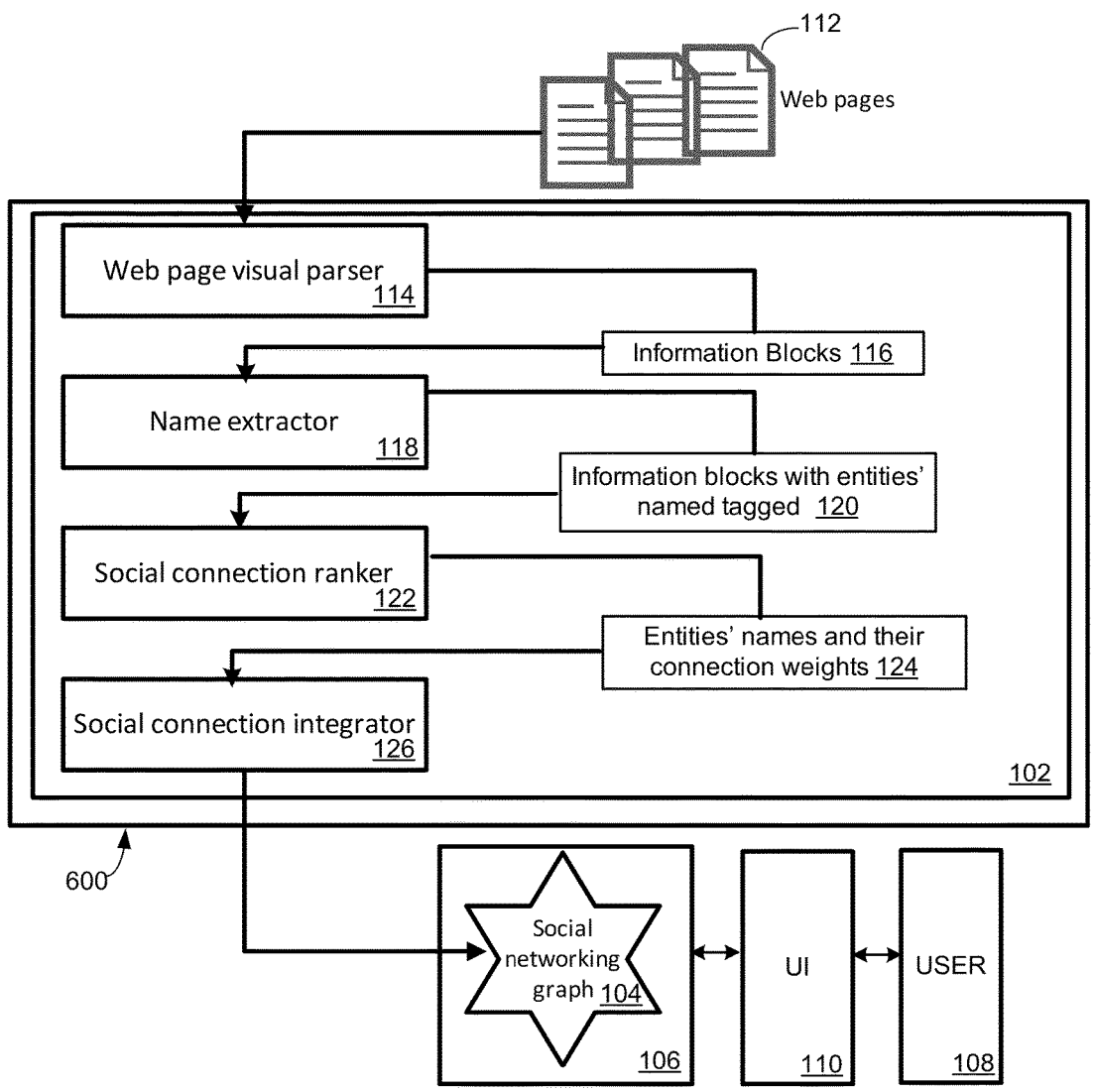
FIG. 1 is an exemplary architecture for employing one exemplary embodiment of the automated social networking graph mining and visualization technique described herein.

FIG. 1 provides an exemplary architecture 100 for employing one embodiment of the automated social networking graph mining and visualization technique. As shown in FIG. 1, the architecture 100 employs a social networking graph mining and visualization module 102 that resides on a computing device 600, which will be discussed in greater detail with respect to FIG. 6.

The social networking graph mining and visualization module 102 operates to mine a social networking graph 104 and present it to a user on a display 106 which a user 108 can manipulate via a user interface 110. Web pages 112 are input into the social networking graph mining and visualization module 102. A Web page visual parser 114 that parses Web page content from each of the Web pages input into information blocks 116. The information blocks 116 are input into a name extractor 118, which recognizes entities' names from information blocks. These entities, could be, for example, people, organizations or key words.

The information blocks 120 with entities' names tagged are input into a social connection ranker 122 that determines and ranks the one or more connections between entities identified in the tagged information blocks 116. The social connection ranker 122 also identifies the strengths of the connections and assigns weights to them. One exemplary procedure for determining the ranking will be discussed in greater detail later. The social connection ranker 122 outputs the ranked entities' names and their connection weights 124. These connection weights 124 are input into a social connection integrator 126 that integrates all of the ranked entities' names and their connection weights 124 and creates and outputs a social networking graph 104 on the display 106 using a force directed model. Once portions of the social networking graph 104 are displayed on the display 106, a user 108 can manipulate the social networking graph 104 to show other portions of it via a user interface 110, which will be discussed in greater detail later.

1.3. Exemplary Processes Employed by the Automated Social Networking Graph Mining and Visualization Technique.

The following paragraphs provide descriptions of exemplary processes for employing the automated social networking graph mining and visualization technique. It should be understood that some in some cases the order of actions can be interchanged, and in some cases some of the actions can even be omitted.

1.3.1 Automated Social Networking Graph Mining.

Figure 2:
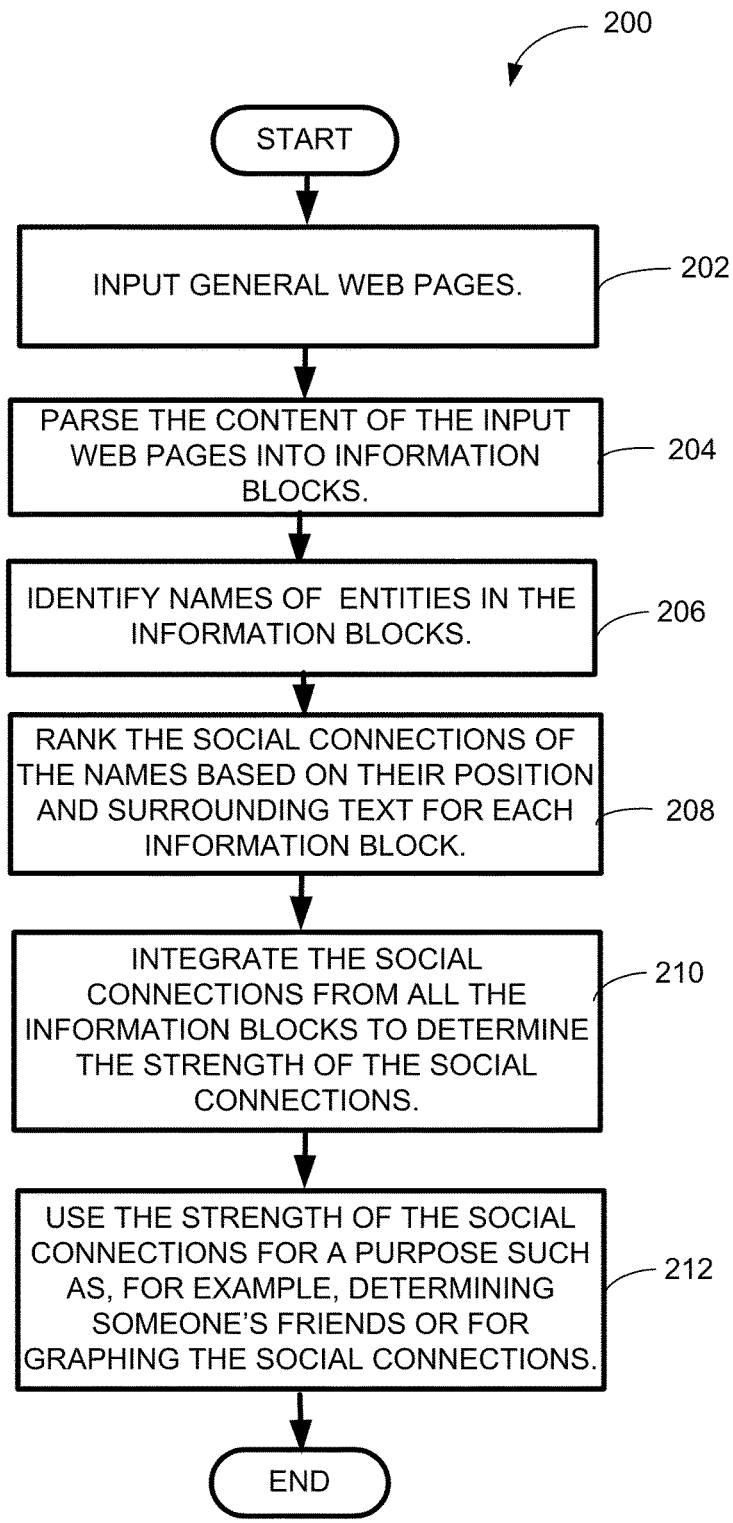
FIG. 2 depicts a flow diagram of an exemplary process for employing the automated social networking graph mining and visualization technique.

A high level flow diagram of a process for employing one embodiment of the automated social networking graph mining and visualization technique is shown in FIG. 2. This embodiment of the technique mines social connections and their strengths from general Web pages. As shown in FIG. 2, block 202, these Web pages are input into the process. These input Web pages can be found, for example, by a Web crawler crawling the Internet.

The content of each of the input Web pages is parsed into information blocks, as shown in block 204. For example, a visual parser that identifies blocks of text or other contiguous blocks of data can be used to parse the content of the Web pages. Various conventional techniques can be used to identify and parse this text or other contiguous blocks of data. The names of people or entities found in the information blocks are then identified, as shown in block 206. For example, this can be done by a conventional name finder. Here a conventional name finder refers to any computer algorithm that can automatically find an entity's name from the information blocks.

As shown in block 208, the social connections among the entities' names in the information blocks are then ranked. In one embodiment of the technique, the ranking considers the position of the names and the surrounding text in the information blocks (e.g., the positions of the names and the particular distance or numbers of words separating the names in the text). The closer two names are to each other, the stronger the strength of the connection is considered. Details regarding the ranking procedure employed by one embodiment of the technique are given later. The ranked social connections from all information blocks are then integrated to determine the strength of the social connections between entities found on the Web pages, as shown in block 210. In one embodiment of the social networking graph mining and visualization technique, the integration considers the frequency with which the same set of names are found on a Web page in addition to the closeness of the names in an information block in determining the strength of the connections found for each information block. The strengths of the social connections can then be used for various purposes, such as, for example, determining who someone's friends are, or for graphing these social connections to provide a visual aid in determining the strength of social connections between people or other entities, as shown in block 212.

1.3.2 Visualizing Social Connections.

Figure 3:
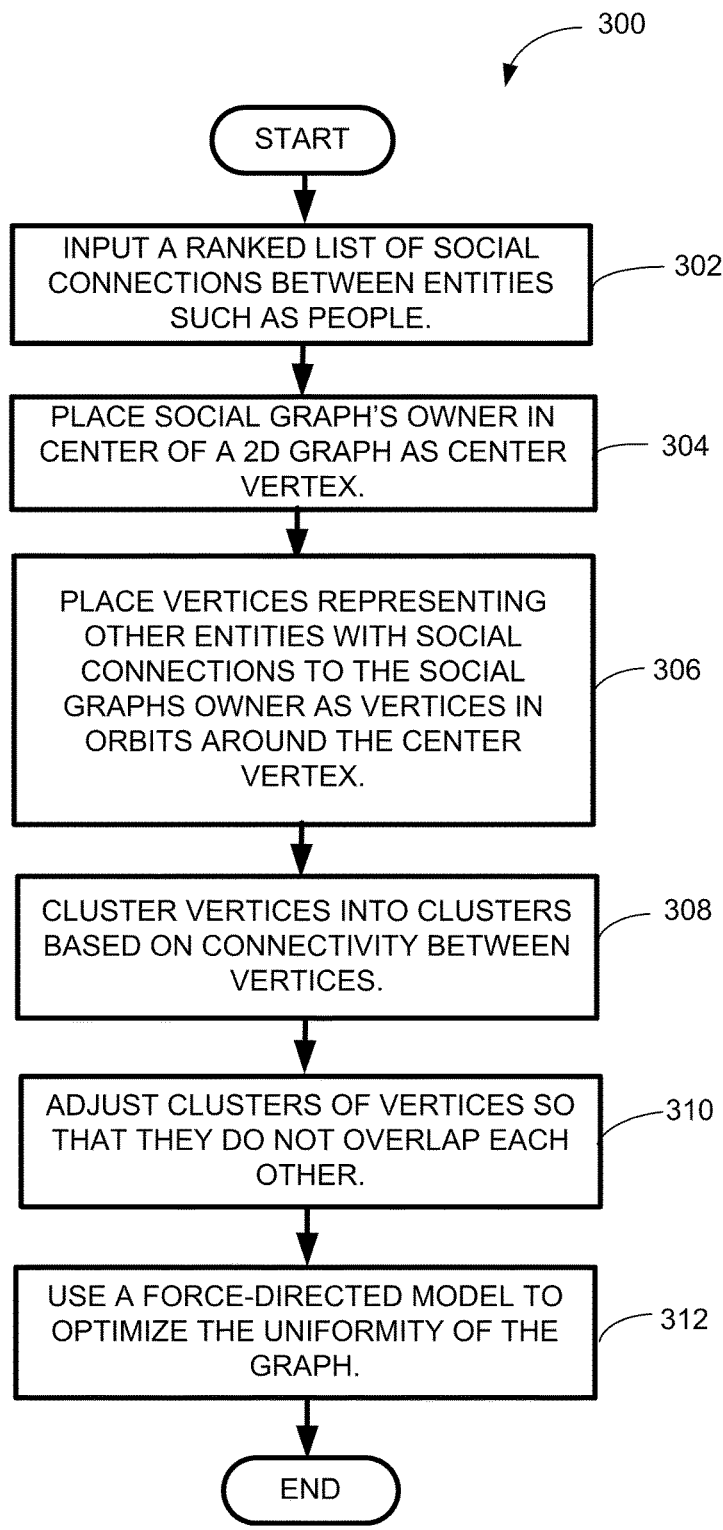
FIG. 3 depicts a flow diagram of an exemplary process for creating a social networking graph according to one exemplary embodiment of the automated social networking graph mining and visualization technique.

FIG. 3 provides a flow diagram of one exemplary process 300 employed by the automated social networking graph mining and visualization technique in order to visualize social connections. In this embodiment of the technique, the social connections among people's/entities' names extracted from general Web pages are represented in the form of a 2-D graph with a set of vertices representing names, and a set of edges representing social connections. A force-directed model is used to represent the 2-D graph and an energy minimization procedure is used to substantially optimize or enhance the layout the 2-D graph.

As shown in block 302, a list of ranked social connections is input. A social graph's owner (the person for which the graph is displayed) is placed in the center of the 2D graph as a center vertex, as shown in block 304. Vertices representing names of people or other entities with social connections to the social graph's owner are placed in difference orbits around the center vertex (orbits around the center vertex based on ranking), as shown in block 306. The shorter the orbit's radius is, the stronger the social connection between the vertex in the orbit and the center vertex is. One orbit around the center vertex is created for each of the social connections, with the vertex (entity) with the strongest social connection to the owner being closest to the center vertex. As shown in block 308, the vertices can then be clustered into different clusters according to the connectivity between the vertices (e.g., clustered in accordance with the connections between them and an energy minimization procedure which will be described in greater detail below). The vertices in the same cluster (e.g., those vertices that have more than one connection between them) are placed close to each other. The clusters of vertices are also placed so that clusters of vertices do not overlap each other, as shown in block 310. As shown in block 312, a force-directed model is then used to substantially optimize the uniformity of the layout of the 2D graph.

Figure 4:
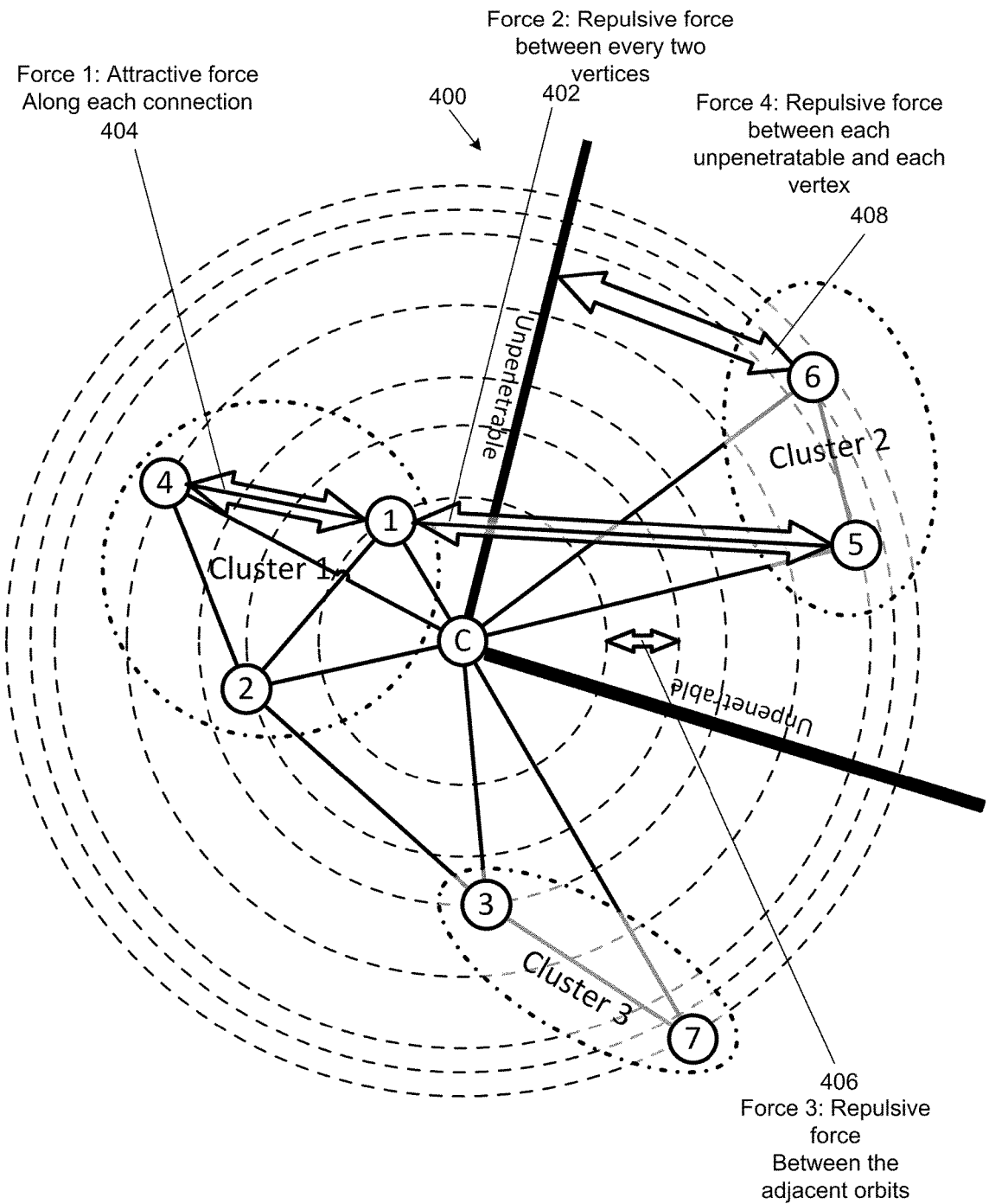
FIG. 4 depicts an exemplary social networking graph created by one exemplary embodiment of the automated social networking graph mining and visualization technique.

FIG. 4 provides an example of the 2D graph layout 400 produced by one embodiment of the technique. In this embodiment of the social networking graph mining and visualization technique, a force-directed model substantially optimizes the layout to be uniform by employing a set of forces and an energy minimization procedure:
1) A repulsive force 402 between each two vertices (an example of which is shown in FIG. 4);
2) An attractive force 404 along the edges (e.g., between the social connections between the vertices 402);
3) A repulsive force 406 between adjacent orbits; and
4) Unpenetratable boundaries 408 that are modeled to isolate the clusters that have no connection between each other.
5) Each of the objects in the graph, for example, each vertex, edge, orbit and the unpenetratable boundary, are either radially/tangentially free or both free so that can move according to a force of the force-directed model.

Hence, there are four kinds of different forces in the force-directed model at each vertex:

The attractive force 404 along the edges $\vec{f}_1(i,j)=d_{i,j}^2$;
the repulsive force 402 between each to vertices $$\vec{f}_2(i,j) = \frac{c_2}{d_{i,j}^2}$$

the repulsive force 406 between adjacent orbits $$\vec{f}_3(O_k, O_{k-1}) = \frac{C_3}{d_{k,k-1}};$$

and
the unpenetratable boundaries $$\vec{f}_4(i, u_m) = \begin{cases} -\frac{c_4}{\theta_{i,U_m}} \theta_{i,U_m} > \tau \\ +\infty \theta_{i,U_m} \leq \tau \end{cases};$$

where i, j represents the i-th vertex and j-th vertex; d represents the distance; $O_k$ represents the k-th orbit; $U_m$ represents the m-th unpenetratable boundary; $C_{1,2,3}$ represent constants; θ represents the positive intersection angle of the line, which goes through the vertex and the center vertex, and the unpenetratable boundary and τ represents a constant threshold. Given the definitions above, the aggregated force at one vertex is $$\vec{F}_i(\text{Placement}) =$$

$$\sum_{\forall j_1 (i,j) \in Edges} \vec{f}_1(i,j) + \sum_{j \neq i} \vec{f}_2(i,j) + \vec{f}_3(O_k, O_{k-1}) + \sum_m \vec{f}_4(i, U_m)$$

When the forces are balanced at one vertex, the aggregated force at that vertex is zero. Therefore, the technique seeks to minimize a sum of aggregated force(s) of all of the vertices. The layout algorithm then finds a proper placement of the vertices where $$\text{Placement} = \arg\min \sum_i |\vec{F}_i|$$

The $$\sum_i |\vec{F}_i|$$

can be regarded as the Energy of the layout so that the layout algorithm actually reduces the total energy of the force model. In one embodiment of the technique, the energy-reduction process is performed in an iterative way. In each iteration, each vertex is moved along the direction of the aggregated force. The process stops when the energy converges to a certain level. More particularly, as the energy goes down, the total displacement of the vertices also decreases. The technique sets a constant threshold value. When the total displacement is less than this value, the iteration process stops. Until that point, the vertices keep moving in each iteration, that is, their position changes.

1.3.3 Ranking Social Connections.

As discussed previously, some embodiments of the social networking graph mining and visualization technique employ a ranking procedure to rank the social connections between entities. The following section gives additional information on the ranking procedure used in one embodiment of the technique.

The ranking employed by one embodiment of the technique can be described as follows. Given a list of entities' names $X=\{x_0, x_1, \ldots\}$ and a list of Web pages $W=\{w_0, w_1, \ldots\}$, each Web page has information blocks $B=\{b_0, b_1, \ldots\}$, if $x_i$, $x_j$ occurred in one information block, the relationship weight between these two names in a information block is defined as $$R_b(x_i, x_j) = R_d \cdot R_c$$

where $R_d$ represents the distance measure of the relationship and $R_c$ represents the context measure of the relationship. The definition of these two measures are as follows.

$$R_d(x_i, x_j) = e\left(1 - \frac{d(x_i, x_j) - 1}{10}\right)$$

$$R_c = (x_i, x_j) = 1.0 K(x_i, x_j) = \phi$$

$$\prod_K k_m K(x_i, x_j) = \{k_m\}$$

Here $d(x_i, x_j)$ represents the character distance between $x_i$, $x_j$ in the information block. If $x_i$, $x_j$ do not show up together in the information block, $d(x_i, x_j)$ is infinite. That is, $R_d$ equals zero. The variable $K(x_i, x_j)$ represents a relationship keyword set, such as "wife", "friend" etc, that been discovered between the two names in the information block. The variable $k_m$ represents the predefined keyword weight, $k_m > 1.0$. In one embodiment, each relationship keyword has a predefined weight, for example, "wife" has weight of 2.0, "friend" has weight of 1.6. $K(x_i, x_j)$ is a set of weights that correspond to the relationship keywords for the two names. If there is no relationship keywords for $x_i$ and $x_j$, $K(x_i, x_j)$ is an empty set which is represented by "φ". Otherwise, $K(x_i, x_j)$ will have one or more values, such as $\{1.6, 2.0, \ldots\}$.

In one embodiment, the keyword set is manually collected. When a keyword from this set exists in an information block with two entity names, a procedure is used to decide whether this keyword is used to describe the relationship between the two entity names. Then, the global relationship weight of $x_i$, $x_j$, is defined as:

$$R(x_i, x_j) = \sum_W \sum_B R_b(x_i, x_j)$$

The ranking procedure can thus compute the relationship weights between all entities in the information blocks and rank the entities and their associated relationship weights accordingly. It should be noted, however, that other ranking procedures could be used to create the ranked list of social connections.

Note that a social graph is defined as G=(V, E), where V is the vertex set and E is the edge set. Each unique entity's/person's name discovered from the Web is a vertex in the graph, that is, V={$x_0, x_1, \ldots$}. Between each $x_i$, $x_j$, pair that has non-zero weight, an edge $e_{ij}$ is defined. Then, E={$e_{ij}$}, where R($x_i, x_j$)>0.

Figure 5:
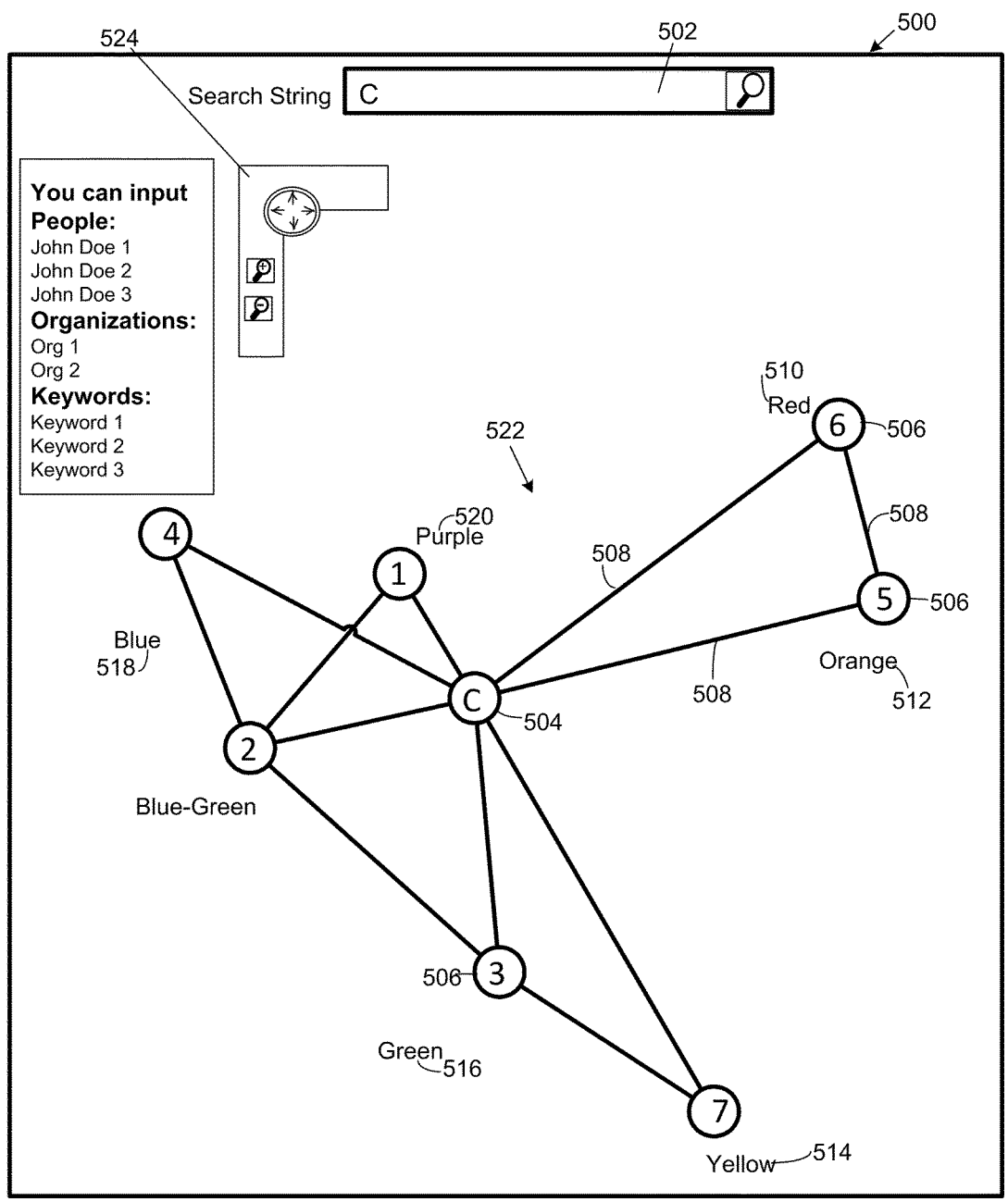
FIG. 5 depicts a graphical user interface employed in one exemplary embodiment of the automated social networking graph mining and visualization technique.

1.4 Exemplary User Interface:

FIG. 5 shows one exemplary user interface 500 for displaying and manipulating a social graph in accordance with one embodiment the automated social networking graph mining and visualization technique. In this embodiment, a user can search for an entity's name (e.g., a person, an organization or a key word) by entering the name (e.g., "C" in this example) in a search box 502. The entity's name (e.g., C) is shown as a center vertex 504 and other connected entities are shown as vertices 506 around the center vertex 504. The strength of the social connections between the vertices 506 are shown as edges 508. The shorter the edge 508 between two vertices 506, the stronger the relationship is between the entities represented by the connected vertices. The longer the edge 508 between two vertices 506, the weaker the relationship is between the entities represented by the connected vertices. In one embodiment, the color of the vertices 506, and optionally the background behind them, varies from 0° to 360° in a rainbow-like color sequence (e.g., red 510, orange 512, yellow 514, green 516, blue 518, and purple 520). Additionally, the more close the nodes or vertices 506 are, the more similar the colors of the nodes (and optionally the background behind the nodes) are. In one embodiment, the node/vertex color changes according to the polar coordinates from 0° to 360°.

In one embodiment, the exemplary user interface 500 also provides animation. For example, when a user clicks (e.g., selects) one vertex 506 with a user input device, the whole social graph/map 522 changes to a new map centered on the clicked on (e.g., selected) vertex. During the switching transition, there are three kinds of animations:

a) originally displayed vertices which will not be on the new map are no longer displayed.

b) originally displayed vertices which will still be in the new map will move to a new position; and c) new vertices which were not in the original map will appear and move to position.

The user interface 500 can also include a curser control 524 to allow a user to move around the map 522 to display additional portions of the graph. A user can also select various vertices 506 to find out additional information about them. For example, in one embodiment, if a user selects a vertex with a mouse or other input device, a pop-up window or display screen with additional information about the entity associated with the selected vertex will be displayed.

2.0 the Computing Environment

The automated social networking graph mining and visualization technique is designed to operate in a computing environment. The following description is intended to provide a brief, general description of a suitable computing environment in which the automated social networking graph mining and visualization technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 6:
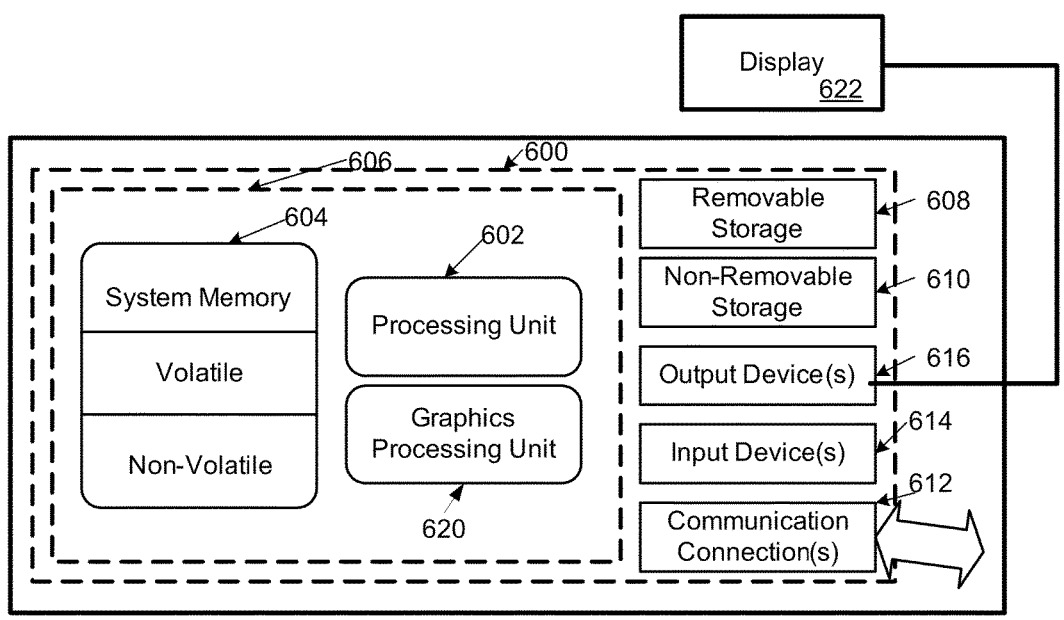
FIG. 6 is a schematic of an exemplary computing device which can be used to practice the automated social networking graph mining and visualization technique.

FIG. 6 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 6, an exemplary system for implementing the automated social networking graph mining and visualization technique includes a computing device, such as computing device 600. In its most basic configuration, computing device 600 typically includes at least one processing unit 602 and memory 604. Depending on the exact configuration and type of computing device, memory 604 may be volatile (such as RAM), nonvolatile (such as ROM, flash memory, etc.) or some combination of the two. This most basic configuration is illustrated in FIG. 6 by dashed line 606. Additionally, device 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Computer readable media include both transitory, propagating signals and computer (readable) storage media. Any such computer storage media may be part of device 600.

Device 600 also can contain communications connection(s) 612 that allow the device to communicate with other devices and networks. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 600 may have various input device(s) 614 such as a display, keyboard, mouse, pen, camera, touch input device, and so on. Output device(s) 616 devices such as a display 622, speakers, a printer, and so on may also be included. All of these devices are well known in the art and need not be discussed at length here.

The automated social networking graph mining and visualization technique may be described in the general context of computer-executable instructions, such as program modules, being executed by a computing device. Generally, program modules include routines, programs, objects, components, data structures, and so on, that perform particular tasks or implement particular abstract data types. The automated social networking graph mining and visualization technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for identifying social connections among entities, comprising:
   using a computing device for: receiving a set of two or more general Web pages that identify social connections between entities; parsing the content of each of the Web pages into information blocks;
identifying names of the entities in the parsed information blocks of each Web page;
   ranking the social connections among the entities' names in each of the parsed information blocks by multiplying a relationship distance measure and a context measure of relationship for each pair of identified entities' names in the information block, wherein the relationship distance measure is determined by measuring distance between the identified entities' names in surrounding text in the information block, and wherein the a context measure of relationship between the pair of identified entities in the information block is based on a relationship keyword existing between the names of the two entities in the information block;
   integrating the ranked social connections from all the information blocks to determine strengths of the connections between the entities associated with the entities' names; and
   displaying a social networking graph based on the strengths of the connections between the entities associated with the entities' names using the integrated ranking of the social connections.

2. The computer-implemented process of claim 1, wherein ranking the social connections among the entities' names further comprises associating connection weights with entities' names.

3. The computer-implemented process of claim 1 wherein the distance between the names is measured by counting the number of words separating the names in an information block on a Web page.

4. The computer-implemented process of claim 1, wherein the context measure of a relationship between two entities is determined by determining if a relationship keyword exists between two entities' names in an information block.

5. A computer-implemented process for graphing social connections among entities' names extracted from general Web pages by creating a 2-D graph with a set of vertices representing names, and a set of edges representing social connections, comprising: using a computing device to perform:
   receiving a ranked list of social connections between a social graph owner and additional entities obtained from information blocks extracted from the general Web pages, wherein the ranked list was obtained by using a context measure of a relationship and a distance measure of relationship, wherein the context measure of relationship is based on a keyword of a keyword set being found between the name of the social graph owner and a name of an entity in an information block, and wherein the distance measure of relationship is determined by measuring the distance between the name of the social graph owner and a name of an entity;
   on a display placing the social graph owner in the center of the 2D graph as a center vertex;
   for each of the additional entities, placing a vertex representing a name of an entity in the ranked list in a difference orbit around the center vertex where the shorter the orbit's radius is, the stronger a social connection between the vertex in the orbit and the center vertex is;
   clustering the vertices into different clusters according to connectivity between the vertices; placing the vertices in the same cluster closer to each other than to vertices in other clusters; placing clusters of vertices so that clusters of vertices do not overlap each other; and
   using a force-directed model to improve the uniformity of the 2D layout.

6. The computer-implemented process of claim 5 wherein the force directed model further comprises a repulsive force between each two vertices and wherein each vertex is either radially or tangentially free or both radially and tangentially free so that it can move according to the repulsive force.

7. The computer-implemented process of claim 5 wherein the force directed model further comprises an attractive force among the edges and wherein each edge is either radially or tangentially free or both radially and tangentially free so that the edge can move according to the attractive force.

8. The computer-implemented process of claim 5 wherein the force directed model further comprises a repulsive force between adjacent orbits and wherein each orbit is either radially or tangentially free or both radially and tangentially free so that the orbit can move according to the repulsive force.

9. The computer-implemented process of claim 5 wherein the force directed model further comprises creating an unpenetratable boundary to isolate the clusters that have no connection to each other.

10. The computer-implemented process of claim 9 wherein each unpenetratable boundary is either radially or tangentially free or both radially and tangentially free so that each unpenetratable boundary can move to isolate clusters that have no connection to each other.

11. The computer-implemented process of claim 5 further comprising minimizing energy in the force-directed model in order to optimize the uniformity of the 2D layout.

12. A system for displaying the social connections among entities' names extracted from general Web pages in the form of creating a 2-D graph with a set of vertices representing names, and a set of edges representing social connections, comprising: a computing device;
  a computer program comprising program modules executable by the computing device, wherein the computing device is directed by the program modules of the computer program to,
  receive a ranked list of social connections between a social graph owner and additional entities obtained from the general Web pages, wherein the ranked list was obtained by using both a measured distance in characters between the name of the social graph owner and the name of a given entity in the content of each one of the general Web pages and a context measure of a-relationship based on a relationship keyword discovered between the name of the social graph owner and the name of the given entity in the content;
  on a display place the social graph owner in the center of the 2D graph as a center vertex;
  for each entity in the ranked list, place a vertex representing a name of an entity in the ranked list in a difference orbit around the center vertex where the shorter the orbit's radius is, the stronger the social connection between the vertex in the orbit and the center vertex is;
  cluster the vertices into different clusters according to the connectivity between the vertices;
  use a force-directed model to optimize the uniformity of the 2D layout, wherein the force-directed model comprises:
  a repulsive force between each two vertices; an attractive force among the edges; a repulsive force between adjacent orbits; and an unpenetratable boundary to isolate clusters that have no connection to each other.

13. The system of claim 12 wherein each vertex, edge, orbit and unpenetratable boundary are either radially or tangentially free or both radially and tangentially free so as to allow movement according to a force.

14. The system of claim 12, further comprising a graphical user interface for displaying the 2D graph on the display and allowing a user to manipulate the 2D graph.

15. The system of claim 12, wherein the graphical user interface further displays the vertices of the 2D graph in color and wherein vertices that are close to each other are displayed in similar colors.

16. The system of claim 12, wherein an entity can be one of a group comprising:
  a person;
  an organization; and
  a key word.

17. The computer-implemented process of claim 12 wherein the ranked list is ranked by relationship weight between two names defined by a distance measure of a relationship and a context measure of a relationship.

18. The system of claim 15 wherein the color of the vertices changes according to polar coordinates of the vertices' locations from 0° to 360°.

19. The system of claim 15 wherein the graphical user interface further comprises animation comprising, when user a selects a vertex, the 2D graph will change to a new 2D graph.

20. The system of claim 19, further comprising during the transition to the new 2D graph, displaying the kinds of animations wherein:
  a) originally displayed vertices which will not be on the new 2D graph are no longer displayed;
  b) originally displayed vertices which will still be in the new 2D graph will move to a new position; and
  c) new vertices which were not in the original 2D graph will appear and move to position.

* * * * *